(12) United States Patent
Leven

(10) Patent No.: US 6,802,307 B2
(45) Date of Patent: Oct. 12, 2004

(54) VIBRATION ABSORBER FOR AN ARCHERY BOW

(75) Inventor: William L. Leven, Canoga Park, CA (US)

(73) Assignee: Leven Industries, Canoga Park, CA (US)

(*) Notice: Subject to any disclaimer, the term of this patent is extended or adjusted under 35 U.S.C. 154(b) by 0 days.

(21) Appl. No.: 10/163,982

(22) Filed: Jun. 6, 2002

(65) Prior Publication Data

US 2003/0226556 A1 Dec. 11, 2003

(51) Int. Cl.[7] .................................................. F41B 5/20
(52) U.S. Cl. ........................................................ 124/89
(58) Field of Search .......................... 124/89; 188/378; 267/136, 137

(56) References Cited

U.S. PATENT DOCUMENTS

| | | | |
|---|---|---|---|
| 3,412,725 A | * | 11/1968 | Hoyt |
| 3,589,350 A | * | 6/1971 | Hoyt et al. |
| 4,132,825 A | * | 1/1979 | Hahn |
| 4,509,730 A | * | 4/1985 | Shtarkman |
| 4,615,327 A | * | 10/1986 | Saunders ...................... 124/89 |
| 5,219,051 A | * | 6/1993 | Davis ......................... 188/378 |
| 6,076,514 A | * | 6/2000 | Adams ........................ 124/89 |

* cited by examiner

Primary Examiner—John A. Ricci
(74) Attorney, Agent, or Firm—Koda & Androlia

(57) ABSTRACT

An apparatus for use with an archery bow which comprises a resilient elastomeric member having at least one end, a coupler for coupling the one end of the resilient elastomeric member to an archery bow and a stabilizer weight provided in the resilient elastomeric member adjacent an opposite end from the one end. In other embodiments the apparatus has another end, a coupling provided in the another end, is barreled and has energy dispersion rings.

16 Claims, 3 Drawing Sheets

VIBRATION ABSORBER FOR AN ARCHERY BOW

BACKGROUND OF THE INVENTION

1. Field of the Invention

The present invention relates generally to an archery accessory. More particularly, it relates to an archery bow resilient mounting means to be attached to the archery bow for the purpose of better reducing bow shock and vibration of the bow upon release of the arrow.

2. Prior Art

Various stabilizers and vibration dampeners have been developed to both positionally stabilize a bow and to absorb the shock occurring in the bow when an arrow is discharged from an archery bow. For example, U.S. Pat. No. 3,524,441 discloses an archery bow stabilizer having an isolated shock cushion mounting base which provides ready attachment to and removal from the archery bow. As disclosed by the '441 patent, a resilient compressible elastomeric bushing in the stabilizer base provides a captive support for attaching to the bow a stabilizer arm which carries a weight at its opposite end. One disadvantage is that, because of the location of that resilient coupling between the stabilizer arm and the bow riser, the bow can twist or wriggle in the archer's hand relative to the weight which tends to remain stationary.

U.S. Pat. No. 4,553,522 discloses a complicated device consisting of five pivotally-connected sections for resiliently mounting a pair of stabilizer rods for universal angular adjustment on a bow. The device has a central member fixed to the bow and a cylindrical portion projecting from each end, a pair of intermediate members, and a pair of outer-end member, each of the outer-end members having means at one end for attachment of a stabilizer rod. The '522 patent has a disadvantage because it requires a complicated device to properly adjust the stabilizer and the archery bow. Also, that device places resilient flexure mounts for the stabilizer rods at the bow-ends of the stabilizer rods.

U.S. Pat. No. 4,779,602 discloses a rod that is threaded at one end into a bow riser to extend forwardly therefrom. An inertia sleeve is slidably on the rod and is biased toward the bow by a stiff spring. The inertia sleeve moves forward against the force of a compression spring when the bowstring is released. The sleeve is then snapped back by spring force toward the bow to apply to the bow an impact which counteracts the tendency of the bow to jump from the archer's hand upon release of the bowstring. A balance weight is fixed to the end of the rod forwardly from the bow.

U.S. Pat. No. 4,893,606 discloses a distributed mass in an inertial archery bow stabilizer and vibration damper which, in use, is rigidly affixed to a bow riser. The '606 patent employs an internal flow-limiting structure and a high-density fluid initial mass to achieve stabilization against forward thrust of the bow. Such stabilization is provided by the relatively large mass of the high-density fluid retained within the tubular rigid body which encloses the stabilizing subassembly. Vibration damping is achieved by movement of fluid through and around the flow-limiting structure within the body. The device also provides a measure of static balance to the bow as it is held in a drawn state, but it does not meaningfully address the problem of the tendency of the bow to twist in the user's hand upon release of the drawn bowstring.

U.S. Pat. No. 4,615,327 discloses an archery bow stabilizer which includes a pair of annular weights which are carried in normally aligned manner at one end of a stabilizer rod which is rigidly affixed to a bow riser at its other end. The weights are connected to each other and to the rod by resilient elastomeric elements disposed within the annular weights. The weights can move out of alignment with each other, and out of alignment with the rod, against the bias of the resilient elements, when the bow riser experiences torque upon release of the arrow from a drawn condition. The device provides a measure of torque stabilization to the bow. The device is heavy, and such additional weights as may be needed can be affixed to the forward end of the forwardmost annular weight. Because of the mass of the device, it is difficult to use it effectively in applications which call for customization to the requirements of a range of bows of different kinds and to the needs of a range of archers.

Other vibration and shock absorbing devices for utilization with a bow are shown in the prior art U.S. patents as follows:

| | |
|---|---|
| 4,245,612 | 4,570,608 |
| 4,936,283 | 4,982,719 |
| 5,273,022 | |

Notwithstanding the above described prior art devices, it is desirable to have a bow stabilizer which allows weights of different size to move relatively freely in response to torquing of a bow on an end of a stabilizer arm which has its other end rigidly connected to the bow riser. It is also desirable that the stabilizer arm not vibrate during times when the stabilizer responds to the dynamic conditions of the bow, particularly at the release of the spring. Such a stabilizer causes less hand shock and better arrow flight, resulting in consistent accuracy as desired by archers. It is also desirable to have a device which provides for ready variability and shock and vibration absorbing ability so that the apparatus can be customized to any particular bow owned by the user or the conditions wherein the bow is being utilized.

SUMMARY OF THE INVENTION

It is the general objection of the present invention to overcome the disadvantages of the prior art as set forth above.

It is still another objection of the present invention to provide a simple, effective, low cost and efficient means for absorbing the shock and vibration of the archery bow upon release of the arrow.

It is another objection of the present invention to provide a means whose simplicity and relatively low cost allows an archer to have an inventory of a number of such devices having different elastic characteristics suited to the different performance characteristics of compound and recurved bows used and owned by the archer.

In keeping with the principles of the present invention, the objects are accomplished by an apparatus for use with an archery bow which includes a resilient elastomeric member having at least one end, a coupling for coupling the one end of the resilient elastomeric member to an archery bow, and a stabilizer weight provided in the resilient elastomeric member adjacent an opposite end from the one end.

The apparatus in other embodiments includes another end with a coupler so that the apparatus may be coupled between the archery bow, particularly at the end of a stabilizer rod, and exterior stabilizing weights. The apparatus may be cylindrical, waisted, barreled and/or provided with shock and vibration energy dispersion rings.

BRIEF DESCRIPTION OF THE DRAWINGS

The above-mentioned features and objects of the present invention, as well as other features and objections of the present invention, will become more apparent with reference to the following description taken together with the accompanying drawings wherein like reference numerals denote like elements and in which.

DETAILED DESCRIPTION OF THE INVENTION

Figure 1:
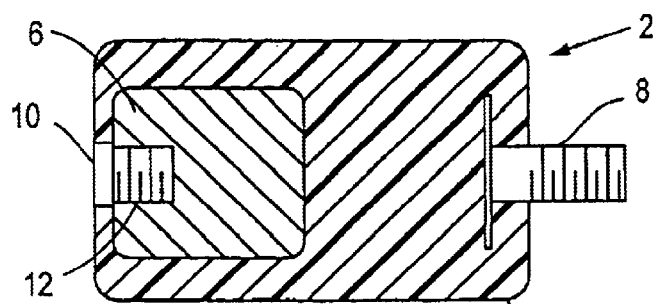
FIG. 1 is a cross-sectional view of a first general embodiment of the present invention.

Referring to FIG. 1, shown therein is a general embodiment shown in cross-section of a shock and vibration absorbing member 2 In accordance with the teachings of the present invention The member 2 includes a cylindrical elastomeric body 4 into which is embedded a weight 6 adjacent one end of the elastomeric body 4. The weight 6 can be made from any dense material such as a metal, a resin which is filled with metallic particles, etc. In the other end of the body 4 is provided a coupler 8. The coupler 8 typically comprises a threaded screw, bolt or shaft with a thread size and pitch suitable for mounting into archery bows or other accessories. In the other end of the elastomeric body 4 is provided a hole 10 which aligns up with a coupling 12. The hole 10 is to allow access to the coupling 12 in the weight 6. The coupling 12 can take the form of a threaded hole or in some situations a threaded shaft may be provided into the coupling 12 to allow it to be connected to some other archery accessories such as stabilizer weights. The elastomeric body 4 can be made of any suitable elastomer such as rubber or resin which provides sufficient stiffness while having sufficient resilience to absorb the shock and vibration generated by the bow after release of an arrow. The preferred hardness of elastomeric body is substantially 40 Durometer, but can be provided in a range from about 20 to about 80 Durometer. Also, the weight 6 can be embedded into the body 4 by any prior art means such as molding.

Figure 2:
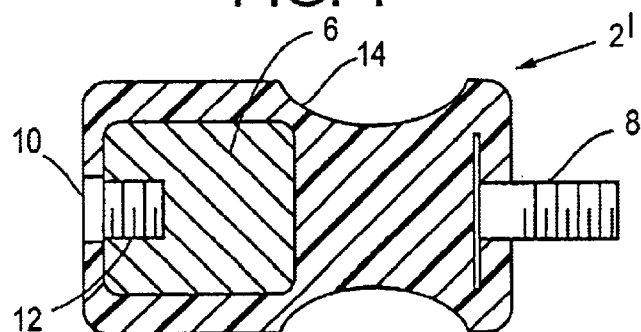
FIG. 2 is a cross-sectional view of a second embodiment of the present invention.

Referring to FIG. 2, shown therein is a cross-section of a second embodiment of the present invention of a resilient elastic shock and energy absorbing member 2'. In this member 2', those elements which are the same as in the first embodiment of FIG. 1 are given the same reference numerals and function the same way. However, the elastomeric body 4', in order to increase its shock and energy absorbing characteristics is provided with a waisted or reduced diameter portion 14. This waisted portion 14 allows for more flexibility and movement of the member 2'.

Figure 3:
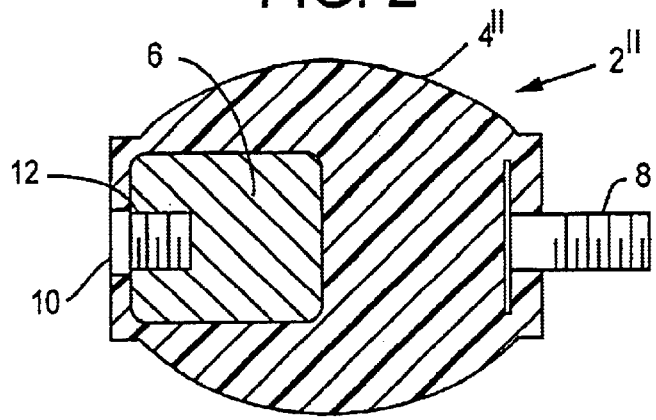
FIG. 3 is a sectional view of a third embodiment of present invention.

Referring to FIG. 3, shown therein is a third embodiment of the present invention shown in cross-section. In this third embodiment, the member 2'' includes an elastomeric body 4'' which is generally barrel shaped instead of the elastomeric bodies 4 and 4' of FIGS. 1 and 2 which are generally cylindrical in shape. The other portions of the third embodiment shown in FIG. 3 which are the same as in FIGS. 1 and 2 are given like reference numerals and function in the same manner. The barrel shaped of the elastomeric body 4 provides for a larger cross-section so that an elastomer with higher flexibility or resiliency can be utilized while still maintaining substantially the same amount of stiffness.

Figure 4:
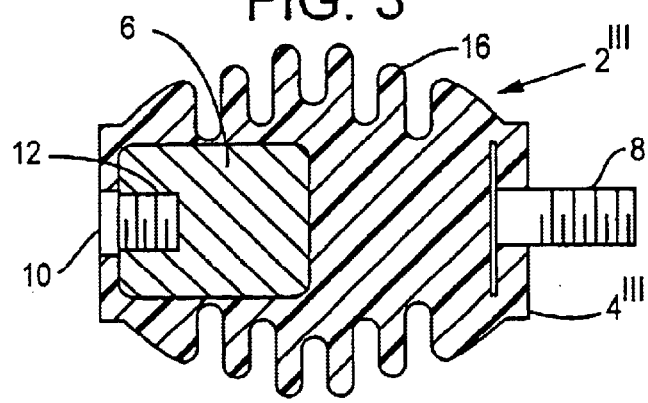
FIG. 4 is a sectional view of a fourth embodiment of the present invention.

Referring to FIG. 4, shown there is a fourth embodiment of the present invention shown in cross-section. In this fourth embodiment, the member 2''' is barrel shaped as in FIG. 3, but the body 4''' is provided with energy dispersion rings 16. All other elements which are the same as and function the same as in the other embodiments are given like reference numerals. The energy dispersion rings 16 are provided to better absorb shock and vibration and disperse the energy. The energy dispersion rings 16 disperse the energy not only by providing lower mass elements which vibrate more easily but also by being provided close enough together so that the energy is further dispersed and absorbed by the dispersion rings 16 contacting together during the absorption of the shock and vibration. As a result, the spacing between the dispersion rings 16 should be close enough to allow the various dispersion rings 16 to contact each other when vibrated. Also, the dispersion rings 16 may be fitted with various additional weights or other stiffening members so that the characteristics of the member 2''' can be varied to match the archery bow or shooting environment and/or the archery bows balance.

Typically, a member 2''' of the present invention would be about 1.5 inches long, having a diameter at the ends between 0.75 and 1.00 inches, have five to seven rings 16 and the thickness of individual rings would be about 0.125 inches with the rings being spaced approximately 0.10 inches apart.

Figure 5:
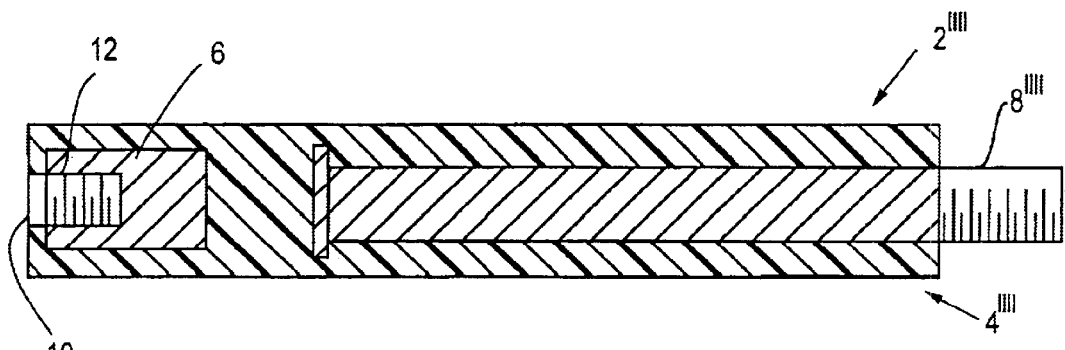
FIG. 5 is a sectional view of a fifth embodiment of the present invention.

Referring to FIG. 5, shown in cross-section is a fifth embodiment of the present invention of an energy and vibration absorbing member 2''''. In this fifth embodiment, the elastomeric body 4'''', while being still cylindrical as in the first and second embodiments, is substantially elongated in the axial direction so as to provide a longer energy absorbing member 2'''' for the purposes of adding additional stiffness or functioning length to the member 2'''', provide some of the functions of a stabilizer without having to use one, etc. Typically, the elastomeric body 4'''' is three to six times longer than a diameter of the elastomeric body 4'''' Those elements of this embodiment of FIG. 5 which are the same in the other embodiments are given like reference numerals. As can be seen in the embodiment of FIG. 5, not only is the elastomeric body 4'''' elongated in the axial direction, but the coupling 8'''' is further extended into the elastomeric body 4'''' a substantial distance. Typically, the member 2'''' of FIG. 5 would be approximately 6–8 inches long.

Figure 6:
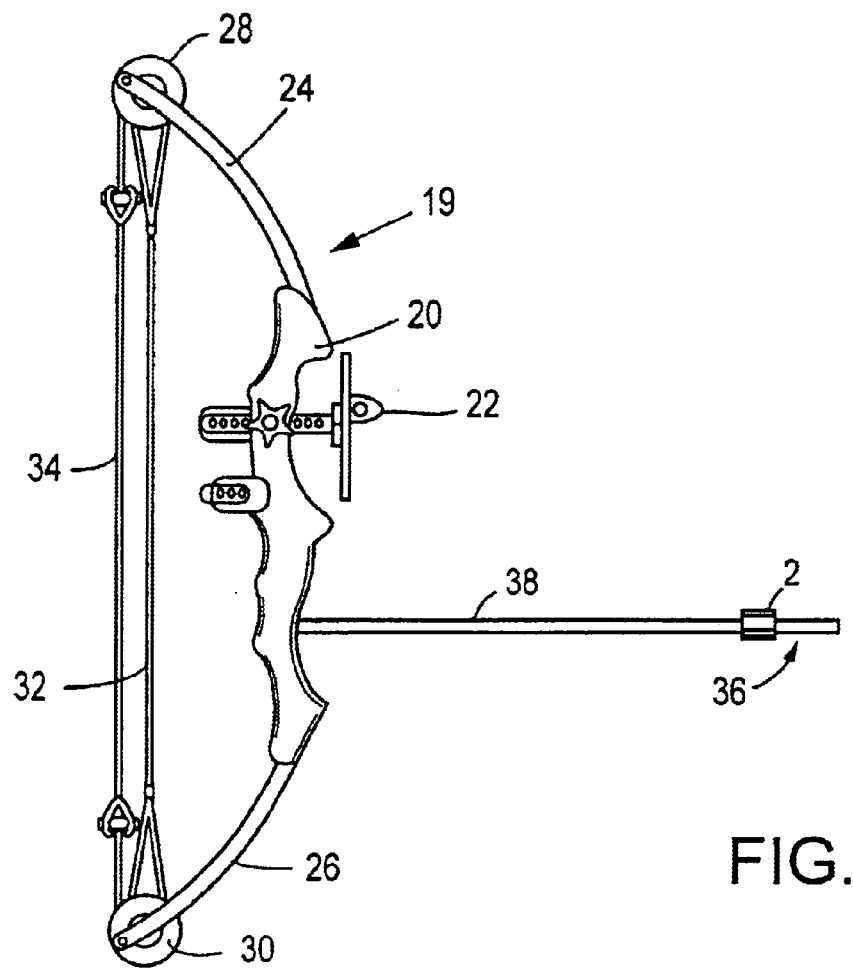
FIG. 6 is a side view of a compound archery bow including the vibration and shock absorbing device of the present invention.

Referring to FIG. 6, shown therein is a compound archery bow 19 comprising a riser 20, a sight 22, upper and lower limbs 24 and 26, and upper and lower pulleys 28 and 30. A cable 32 extends over the upper and lower pulleys 28 and is connected to a string 34. A stabilizing system comprising stabilizer weights 38 coupled to one end of a member 2 having its other end connected to a stabilizing rod 38 which in turn is coupled to the riser 20 of the compound archery bow 19.

In operation, when an arrow is fitted to the string 34, the string 34 is then pulled back and released. Upon release of the string 34, the arrow moves forward toward the target and substantial shock and vibration is generated in the compound bow 19 by the energy of the bow 19 which is not transferred to the arrow. This shock travels through the string 34, cable 32, arms 24 and 26, riser 20 and down the stabilizing rod 38. The elastomeric characteristics together with the weight 6 provided within the elastomeric body 4 of the member 2 functions to absorb the energy and vibration which is further assisted in function by the weights 36. Still further, by providing the weight 6 within the elastomeric body 4, the number and amount of external stabilizing weights 36 can be reduced.

Figure 7:
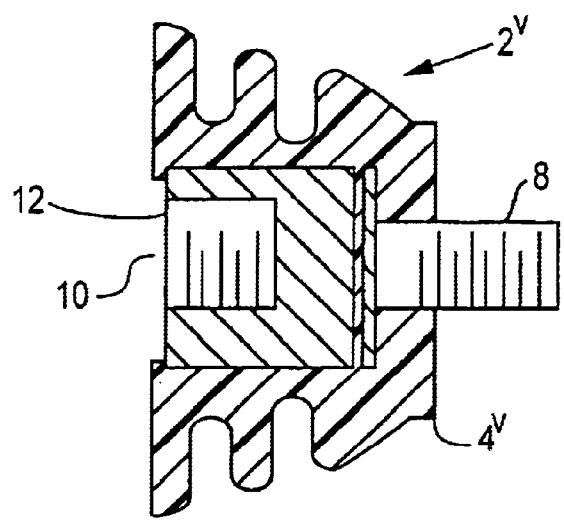
FIG. 7 is a cross-sectional view of a sixth embodiment of the present invention.

Referring to FIG. 7, shown therein is a sixth embodiment in cross-section of the present invention. This sixth embodiment is essentially half of the fourth embodiment and comprises a member 2ᵛ having an elastomeric body 4' which itself is approximately half of the elastomeric body 4''' of FIG. 4. All other elements of this sixth embodiment which are the same and function the same as in the other embodiments are given like reference numerals.

This member 2ᵛ is for utilization in those instances wherein an archer desires additional vibration absorbing capability without having to add additional weights. In other words, the embodiment of FIG. 7 could be utilized at the end of the stabilizing weights 36 in the bow of FIG. 6 or could be screwed into any appropriate mount on the riser 20. However, if the archer requires to adjust the balance of his bow, additional weights could be screwed into the coupling 12 through the hole 10.

Figure 8:
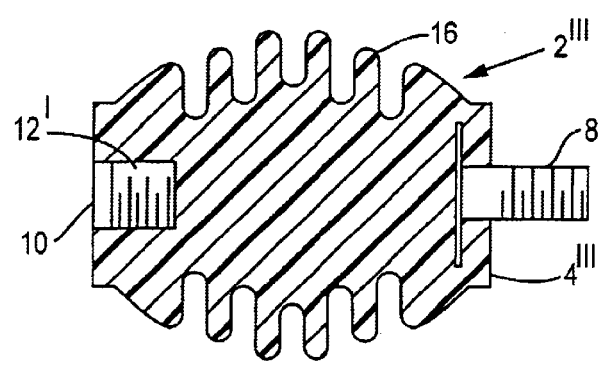
FIG. 8 is a cross-sectional view of a seventh embodiment of the present invention.

Referring to FIG. 8, shown therein is a seventh embodiment in cross-section of the present invention. In this seventh embodiment, the weight 6 is eliminated for those uses wherein it is desirable to have the vibration and shock absorbing capabilities of the present invention without the additional weight of an internally provided weight 6. In this embodiment, the coupling 12' is embedded in the body 4''' by any prior art means such as molding. In all other manners, the embodiment of FIG. 8 is substantially the same as FIG. 4 without the weight 6 and like elements which function substantially in the same way are given like reference numerals. Similar to the embodiment of FIG. 8, the other embodiments of FIGS. 1–3 and 7 could be modified to provide other embodiments similar to FIG. 8 by eliminating the weight 6.

It should be apparent to those skilled in the art that various embodiments of the present invention can be given to substantially the same use; however, it should also be apparent to one of ordinary skill in the art that numerous and varied other arrangements of the present invention could be devised without departing from the spirit and scope of the present invention.

I claim:

1. An apparatus for absorbing vibration and shock of an archery bow upon release of an arrow, the apparatus comprising:
   an elongated elastomeric member of selected geometry and having resilient properties selected and defined to cause the member to normally absorb vibration and shock, said member having at least one end;
   a weight provided in said elastomeric member opposite said one end; and
   a connecting means for coupling said one end of the member to an archery bow; and wherein
   said selected geometry is substantially a cylinder; and
   said cylinder is provided with a waisted portion adjacent the one end.

2. An apparatus for absorbing vibration and shock of an archery bow upon release of an arrow, the apparatus comprising:
   an elongated elastomeric member of selected geometry and having resilient properties selected and defined to cause the member to normally absorb vibration and shock, said member having at least one end;
   a weight provided in said elastomeric member opposite said one end; and
   a connecting means for coupling said one end of the member to an archery bow; and wherein
   the selected geometry is substantially barrel shaped.

3. The apparatus according to claim 2, wherein said general barrel shaped body is provided with radially extending dispersion fins.

4. The apparatus according to claim 2, wherein said elastomeric member is provided with an other end opposite said one end and said an other end is provided with a coupling means.

5. The apparatus according to claim 4, wherein said coupling means extends through said another end of said elastomeric member and into said weight.

6. The apparatus according to claim 2, wherein a hardness of a material from which said elongated elastomeric member is made is substantially 20–80 Durometer.

7. The apparatus according to claim 6, wherein said hardness is 40.

8. The apparatus according to claim 6, wherein said material from which said elongated elastomeric member is made is selected from the group consisting of rubber and resins.

9. An apparatus for absorbing vibration and shock of an archery bow upon release of an arrow, the apparatus comprising:
   an elongated elastomeric member come and having resilient properties selected and defined to cause the member to normally absorb vibration and shock, said member having at least one end;
   a weight provided in said elastomeric member opposite said one end; and
   a connecting means for coupling said one end of the member to an archery bow; and wherein
   said selected geometry is substantially a cylinder; and
   a length of the elongated elastomeric member is three to six times a diameter thereof.

10. An apparatus for absorbing vibration and shock of an archery bow upon release of an arrow, the apparatus comprising:
    an elongated elastomeric member of selected geometry and having resilient properties selected and defined to cause the member to normally absorb vibration and shock, said member having at least one end and said selected geometry is generally barrel shaped with radially extending dispersion fins; and
    a connecting means for coupling said one aid of the member to an archery bow.

11. A method for absorbing shock and vibration in an archery bow comprising the step of coupling an angularly flexible resilient member to said archery bow, said annularly flexible resilient member comprising:
    an elongated elastomeric member of selected geometry and having resilient properties selected and defined to cause the member to normally absorb vibration and shock, said member having at least one end;
    a weight provided in said elastomeric member opposite said one end; and a connecting means for coupling said one end of the member to said archery bow; and wherein said selected geometry of said angularly flexible resilient member is substantially a cylinder; and said cylinder is provided with a waisted portion adjacent the one end.

12. A method for absorbing shock and vibration in an archery bow comprising the step of coupling an angularly flexible resilient member to said archery bow, said angularly flexible resilient member comprising:

an elongated elastomeric member of selected geometry and having resilient properties selected and defined to cause the member to normally absorb vibration and shock, said member having at least one end;

a weight providing in said elastomeric member opposite said one end; and a connecting means for coupling said one end of the member to said archery bow; and wherein the selected geometry of the angularly flexible resilient member is substantially barrel shaped.

13. The method according to claim 12 further comprising interposing a stabilizer arm between said one end of said angularly flexible resilient member and said archery bow and coupling a stabilizer weight to another aid of said angularly flexible resilient member.

14. The method according to claim 12, wherein the generally barrel shaped angularly flexible resilient member is provided with radially extending dispersion fins.

15. The method according to claim 12, wherein said angularly flexible resilient member is provided with an other end opposite said one end and said an another end is provided with a coupling means.

16. The method according to claim 15, wherein said coupling means extends through said another end of said angularly flexible resilient member and into said weight.

* * * * *